US010057618B2

(12) United States Patent
Drouin et al.

(10) Patent No.: US 10,057,618 B2
(45) Date of Patent: Aug. 21, 2018

(54) SYSTEM FOR FILTERING MEDIA MANIFESTS USING MANIFEST ATTRIBUTES

(71) Applicant: Microsoft Technology Licensing, LLC, Redmond, WA (US)

(72) Inventors: Nicolas Drouin, Bellevue, WA (US); Ismail Cenk Dingiloglu, Kirkland, WA (US); Eok Kim, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/298,740

(22) Filed: Jun. 6, 2014

(65) Prior Publication Data
US 2015/0358662 A1    Dec. 10, 2015

(51) Int. Cl.
*H04N 21/2668*   (2011.01)
*H04N 21/2225*   (2011.01)
(Continued)

(52) U.S. Cl.
CPC ..... *H04N 21/2668* (2013.01); *H04N 21/2225* (2013.01); *H04N 21/2393* (2013.01); *H04N 21/23439* (2013.01); *H04N 21/25891* (2013.01); *H04N 21/2662* (2013.01); *H04N 21/26258* (2013.01); *H04N 21/454* (2013.01); *H04N 21/4755* (2013.01); *H04N 21/6582* (2013.01);
(Continued)

(58) Field of Classification Search
CPC ........... H04N 21/2389; H04N 21/2407; H04N 21/26616
See application file for complete search history.

(56) References Cited

U.S. PATENT DOCUMENTS

| 8,099,490 B2 | 1/2012 | Deakin |
| 8,190,674 B2 | 5/2012 | Narayanan et al. |

(Continued)

FOREIGN PATENT DOCUMENTS

| EP | 2592809 A1 | 5/2013 |
| GB | 2481529 A | 12/2011 |

(Continued)

OTHER PUBLICATIONS

"Manifest Manipulation", Retrieved on: Jan. 29, 2014, Available at: http://cdn2.hubspot.net/hub/111935/file-323914856-pdf/Documents/DMM_with_SDC.pdf.

(Continued)

*Primary Examiner* — Nasser Goodarzi
*Assistant Examiner* — Adil Ocak
(74) *Attorney, Agent, or Firm* — Workman Nydegger

(57) ABSTRACT

A method includes acts for providing a VOD or streaming video manifest. The method includes at a server, receiving a request for a manifest from a client device. The request for a manifest includes an identification of one or more filters to be applied to a returned manifest. The method further includes, at the server, identifying the manifest. The manifest identifies different portions of a multimedia asset that can be delivered to client devices. The method further includes applying the one or more identified filters to the manifest to generate a filtered manifest that excludes one or more items as dictated by the one or more filters. The filtered manifest is returned to the client device.

20 Claims, 11 Drawing Sheets

(51) Int. Cl.
*H04N 21/2343* (2011.01)
*H04N 21/239* (2011.01)
*H04N 21/258* (2011.01)
*H04N 21/454* (2011.01)
*H04N 21/475* (2011.01)
*H04N 21/262* (2011.01)
*H04N 21/2662* (2011.01)
*H04N 21/658* (2011.01)
*H04N 21/472* (2011.01)
*H04N 21/845* (2011.01)

(52) U.S. Cl.
CPC ... *H04N 21/47202* (2013.01); *H04N 21/8456* (2013.01)

(56) References Cited

U.S. PATENT DOCUMENTS

| | | | |
|---|---|---|---|
| 8,495,675 B1* | 7/2013 | Philpott | H04H 20/103 725/105 |
| 8,677,428 B2* | 3/2014 | Lewis et al. | 725/91 |
| 2006/0031187 A1* | 2/2006 | Pyrce et al. | 707/1 |
| 2009/0030952 A1 | 1/2009 | Donahue et al. | |
| 2010/0195974 A1 | 8/2010 | Zheng et al. | |
| 2011/0082946 A1* | 4/2011 | Gopalakrishnan | H04L 65/4084 709/231 |
| 2011/0231885 A1 | 9/2011 | Liu et al. | |
| 2011/0307934 A1 | 12/2011 | Kuo | |
| 2012/0173753 A1 | 7/2012 | Moorthy | |
| 2012/0222063 A1 | 8/2012 | Mao et al. | |
| 2012/0271920 A1 | 10/2012 | Isaksson | |
| 2013/0042013 A1 | 2/2013 | Bouazizi | |
| 2013/0051554 A1 | 2/2013 | Braness et al. | |
| 2013/0067036 A1 | 3/2013 | Nooney et al. | |
| 2013/0067052 A1* | 3/2013 | Reynolds | H04L 67/02 709/223 |
| 2013/0097309 A1* | 4/2013 | Ma | H04L 29/08099 709/224 |
| 2013/0136190 A1 | 5/2013 | Hallmarker et al. | |
| 2013/0159455 A1 | 6/2013 | Braskich et al. | |
| 2013/0179587 A1 | 7/2013 | Xiong et al. | |
| 2013/0246578 A1* | 9/2013 | Moreman | H04L 67/2842 709/219 |
| 2013/0311670 A1 | 11/2013 | Tarbox et al. | |
| 2014/0025836 A1 | 1/2014 | Gupta | |

FOREIGN PATENT DOCUMENTS

| | | |
|---|---|---|
| WO | 2009118041 A1 | 10/2009 |
| WO | 2011090715 A2 | 7/2011 |
| WO | 2014004955 A1 | 1/2014 |

OTHER PUBLICATIONS

"Dynamic Packaging", Published on: Sep. 27, 2013, Available at: http://msdn.microsoft.com/en-us/library/windowsazure/jj889436.aspx.

Staykov, Anton, "A Look into Windows Azure Media Services", Published on: Oct. 10, 2013, Available at: https://www.simple-talk.com/cloud/platform-as-a-service/a-look-into-windows-azure-media-services/.

Deutscher, John, "Apple HTTP Live Streaming with IIS Media Services", Published on: Jun. 10, 2010, Available at: http://www.iis.net/learn/media/live-smooth-streaming/apple-http-live-streaming-with-iis-media-services.

"Working with a DVR Rolling Window in OSMF", Published on: Sep. 18, 2012, Available at: http://help.adobe.com/en_US/OSMF/1.0/Dev/WSc6f922f643dd2e6d-52f690561323a97bbbd-7ffe.html.

"Scheduling Media Clips", Published on: Jun. 30, 2013, Available at: http://msdn.microsoft.com/en-us/library/ee958036(v=vs.95).aspx.

"International Search Report and Written Opinion Issued in PCT Application No. PCT/US2015/034310", dated Aug. 14, 2015, 12 Pages.

"Office Action Issued in European Patent Application No. 15736689.9", dated Dec. 21, 2017, 5 Pages.

* cited by examiner

SYSTEM FOR FILTERING MEDIA MANIFESTS USING MANIFEST ATTRIBUTES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has facilitated delivery of multimedia content from content service providers. For example, end users can stream video and/or audio content over networks to their devices. Such streaming may be live streaming or on-a demand streaming.

When users wish to stream content, there are a number of constraints which constrain what content may be streamed. For example, network bandwidth may limit the bitrate of a stream. Alternatively or additionally, a device to which content is streamed may only support certain codecs for decoding content, may have limited display resolution for displaying content, may have limited processor power for decoding and playing content, etc. In contrast, users of high powered devices, that support many codecs, have high screen resolutions, have rich surround sound capabilities, and are connected to high bandwidth networks may wish to have the highest quality content possible delivered to them. Thus, a user may wish to have streaming content delivered which is appropriate for their device, whether that content is of the highest quality available, the lowest quality available, or something in-between.

Content providers typically provide content through the use of an "asset". The asset is a collection of multimedia content pieces, any of which can be delivered to an end user device if requested by the end user device. For example, an asset may include several different video files, where each video file is a differently encoded version of the same source video. Thus, for example, one version may be a 1080p version of the video encoded at 1.5 Mb/s bitrate. Another may be a 720p version of the video encoded at 1 Mb/s bitrate. Another version may be a 720p version of the video encoded at 0.7 Mb/s bitrate. And so forth. The asset may additionally or alternatively store a number of audio tracks. For example, the asset may store a 7.1 track, a 5.1 track, a stereo track, a mono track, as well as various language specific tracks. Thus, the asset may be quite large in size and be able to provide various options for playback.

To indicate to the end user what content is available, a manifest of the asset may be provided. The manifest lists all of the available parts of the asset that the user can select to stream. Often, a device will receive a manifest and select the highest quality portions for streaming. However, the device may not be able to support these portions (at all or in a seamless way) and thus may need to stop attempting playback of high quality content and select lower quality content. This results in some inefficiencies as devices try to find an appropriate quality stream for the particular device.

Some systems address this issue by creating different assets for different devices. Thus, a user device can follow a URL to a particular asset for their device. However, this results in the need for multiple different assets and results in both a fragmented implementation of content delivery for a given media offering and inefficiencies related to storing (and caching at content distribution edge nodes) different versions of a media offering.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing a manifest which describes a rendition of a Video on Demand (VOD) or Live asset. The method includes at a server, receiving a request for a manifest from a client device. The request for a manifest includes an identification of one or more filters to be applied to a returned manifest. The method further includes, at the server, identifying the manifest. The manifest identifies different portions of a multimedia asset that can be delivered to client devices. The method further includes applying the one or more identified filters to the manifest to generate a filtered manifest that excludes one or more items as dictated by the one or more filters. The filtered manifest is returned to the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may provide the ability to maintain a single asset, but provide different versions of a manifest for the asset to client devices. In particular, a filter may be applied to a manifest which filters out certain details of the manifest to create a filtered manifest. The filtered manifest is then provided to the client device such that the filtered manifest provides a limited "view" of the different elements available from the asset.

In some embodiments, a client device can specify what filters are to be applied to a manifest for an asset. The client device can identify the asset and identify the filter to be applied to a server. The server can then apply the filters at the server on the manifest for the asset and send the filtered manifest to the client.

Some embodiments may be directed to filter management at a server. In particular, an asset can be annotated with the filters that can be applied to the manifest for that asset. In some embodiments, a client device can request a list of filters that can be applied, and the server can provide the list in response. In some embodiments the client can be periodically updated with a list of different filters that can generally be applied.

Figure 1:
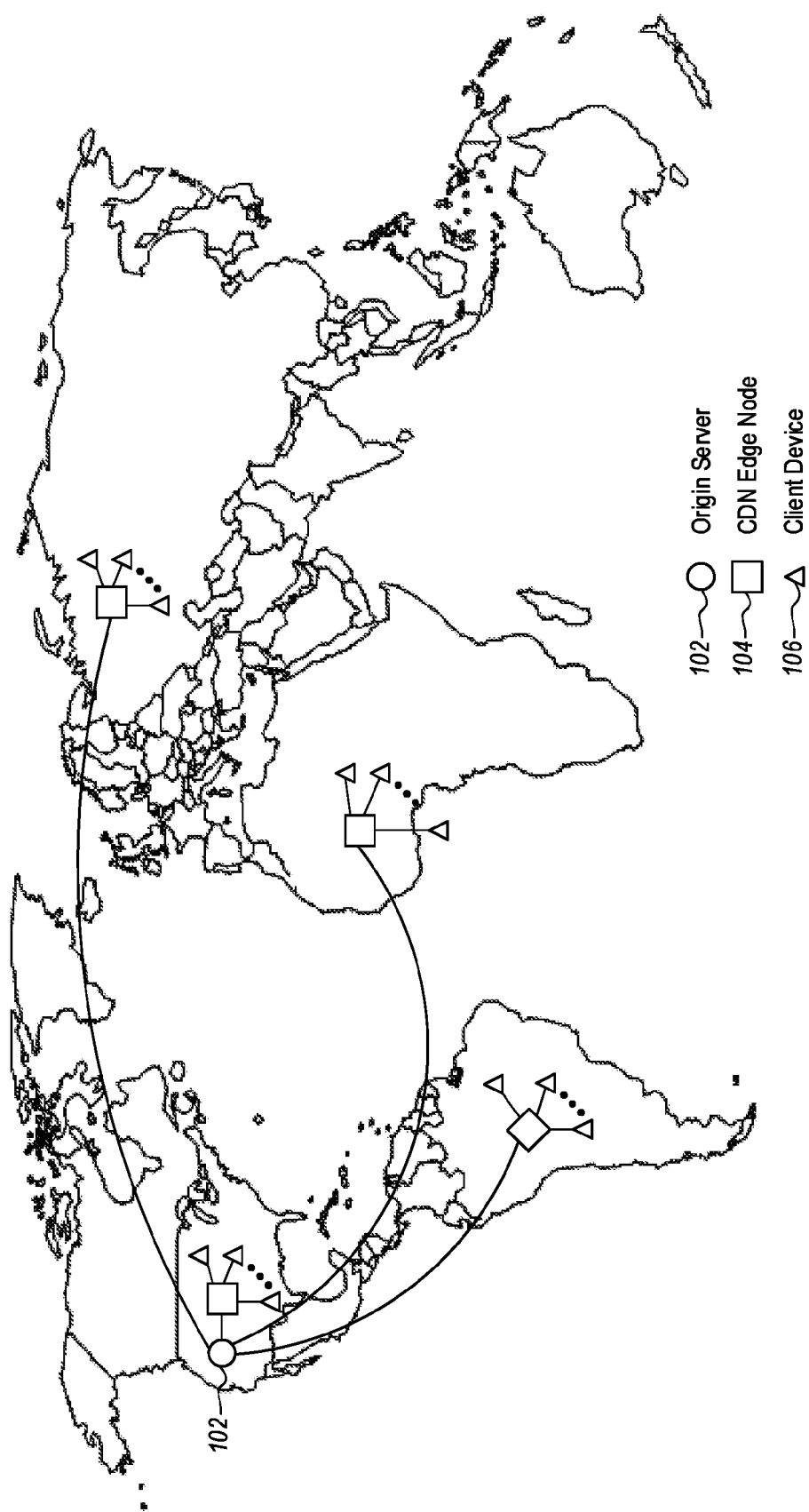
FIG. 1 illustrates an example of a content distribution network including a content distribution server, edge nodes, and client devices.

Referring now to FIG. 1, an example of streaming or on-demand media distribution is illustrated. While the examples herein are in the context of video streaming or video on-demand (VOD) it should be appreciated that other media streaming or on-demand delivery can be performed within the context of the embodiments of the invention disclosed herein.

FIG. 1 illustrates an origin server 102. The origin server 102 is centralized source from which streaming media is distributed. As will be discussed in more detail herein, the origin server may store assets (see e.g. asset 202 in FIG. 2) that include the various video, audio, sub-title, etc. streams that can be delivered to a user. An asset can be quite large in size.

Because of the network demands for streaming media, it is often desirable to have an asset in close geographic proximity to an end user client device where the media will eventually be delivered. To accomplish this, a content distribution network (CDN) may be implemented. To implement a content distribution network, CDN edge nodes 104 may be geographically distributed in various locations. The CDN edge nodes can cache a copy of assets at the CDN edge node 104.

Each asset is associated with a manifest. The manifest contains a list of the various streams that are available in the given asset. The manifest can be cached at the CDN edge node 104 where it can be provided to a client device 106 or can be provided directly by the origin server 102.

Using the manifest, a client device 106 can request portions of an asset to stream. However, some client devices may attempt to stream portions of the asset that they are unable to stream in a satisfactory way, either because the device itself does not have the appropriate codecs or processing power; or because the network bandwidth is too low to allow delivery of the asset portion. The client device will then have to iteratively try lower and lower quality or size portions of the asset; or differently encoded portions to identify a portion that the client device 106 is able to playback. However, embodiments herein allow the manifest to be filtered (see FIG. 3) so that the manifest received by the client device 102 includes a reduced enumeration of asset portions available. In this way, the client device 102 will not attempt to request certain portions of the asset because those portions will not be identified in the manifest.

Note that in this simple example, the illustration is directed to determining what portions of an asset are included in a manifest. However, it should be appreciated, and will be explained in more detail below, that the manifest may include various time offsets and other information that could also be filtered to present only portions of a video, to identify appropriate commercial locations, etc.

Figure 2:
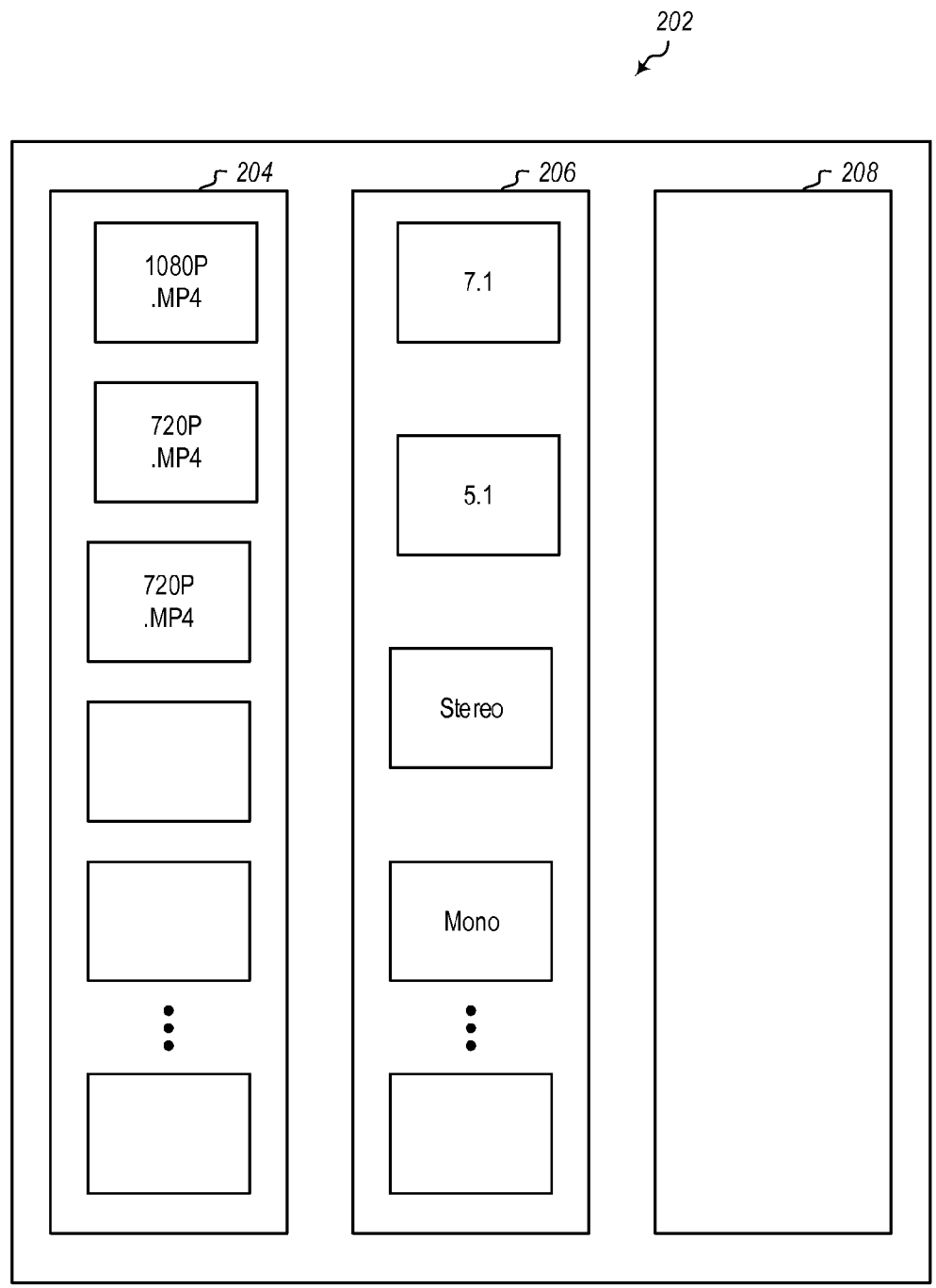
FIG. 2 illustrates an example of an asset manifest.

Referring now to FIG. 2, an asset 202 is illustrated. The asset 202 maybe conceptualized as a volume. In the illustrated example in FIG. 2, the asset 202 includes various portions. For example, the asset 202 may include a set of video files 204. The asset 202 may include a set of audio files 206. The manifest may also include additional information, such as timing information 208. This timing information may include sets of time markers identifying segments of an asset with a beginning and end time marker. As noted above, the manifest may enumerate the various portions of the asset 202. The user at a client device 106 may use the manifest to select portions of the asset to stream to the client device.

Figure 3:
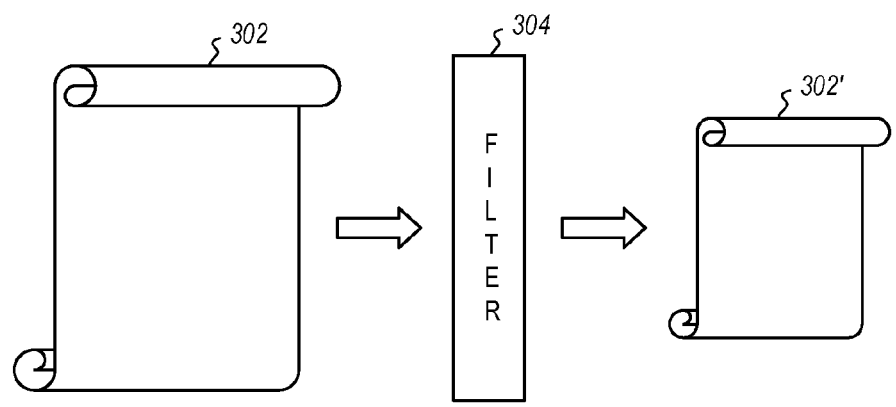
FIG. 3 illustrates an example of a manifest filter.

Referring now to FIG. 3, an example of manifest filtering is illustrated. FIG. 3 illustrates a manifest 302 that includes an enumeration of the various portions of the asset. The filter 304 may be applied to the manifest 302 which results in the creation of a filtered manifest 302'. The filtered manifest 302' includes an enumeration of less than all of the elements enumerated in the manifest 302. This may be done to limit the portions of the asset 202 that a user can request at their client device 106. Notably, limiting is not necessarily performed to limit to lower quality streams. For example, consider the case were a client device 106 is coupled to a high bandwidth network, and is a device capable of playing very high quality media streams. In such an example, the content provider many desire to limit the choices of streaming media to high quality sources and thus may filter out any lower quality streams from the manifest 302.

Figure 4A:
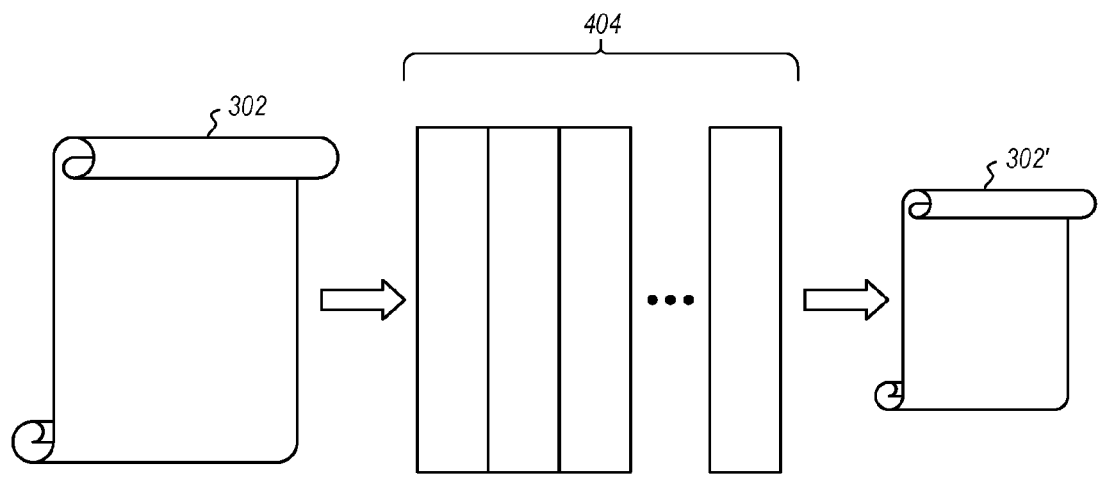
FIG. 4A illustrates using several manifest filters together.

Referring now to FIG. 4A, an additional example of filtering is illustrated. In the example illustrated in FIG. 4A, a manifest 302 has a set of filters 404 applied to the manifest 302 to produce a filtered manifest 302'. This example illustrates that filters can be serially applied to a manifest to customize a manifest offering.

Figure 4B:
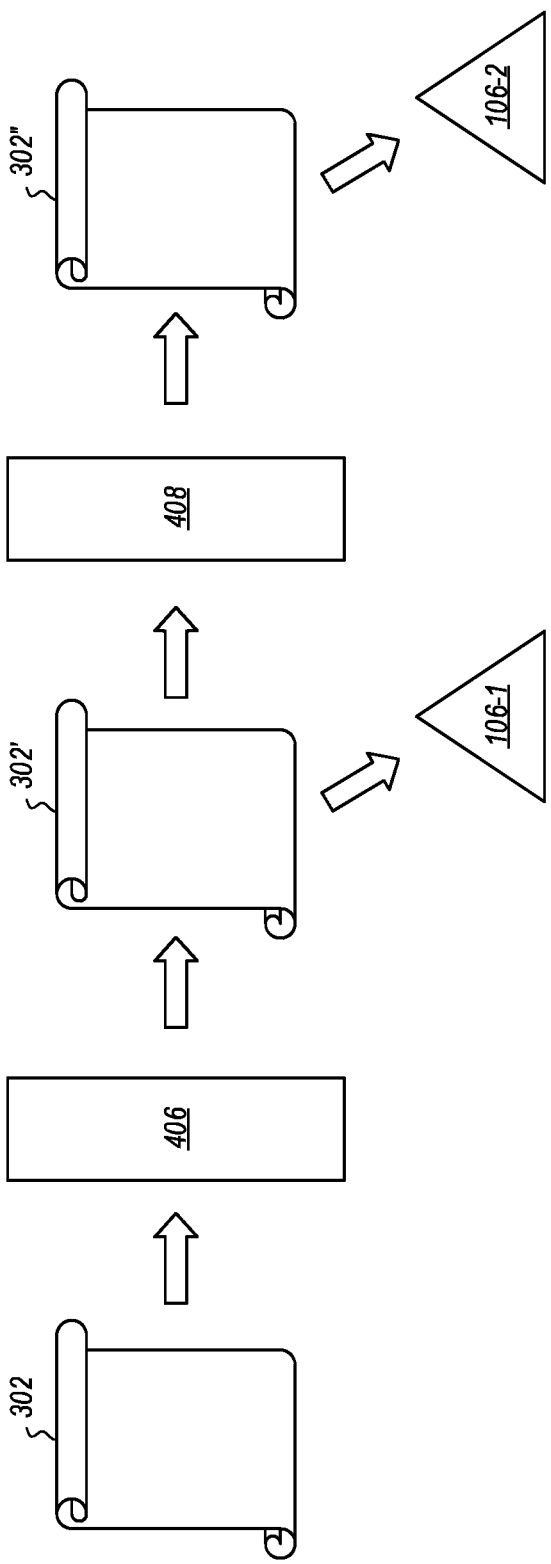
FIG. 4B illustrates using several manifest filters and sending different filtered manifests to different clients.

In an alternative or additional embodiment as illustrated in FIG. 4B, the manifest 302 may different filters 406 and 408 applied serially with intermediate filtered manifests. Thus, for example, filter 406 is applied to the manifest 302 to produce the filtered manifest 302'. Filtered manifest 302' can be sent to a first client 106-1. Filter 408 is applied to filtered manifest 302' to produce filtered manifest 302". Filtered manifest 302" is sent to client 106-2. Thus, intermediate results may be used as appropriate for different clients.

Figure 4C:
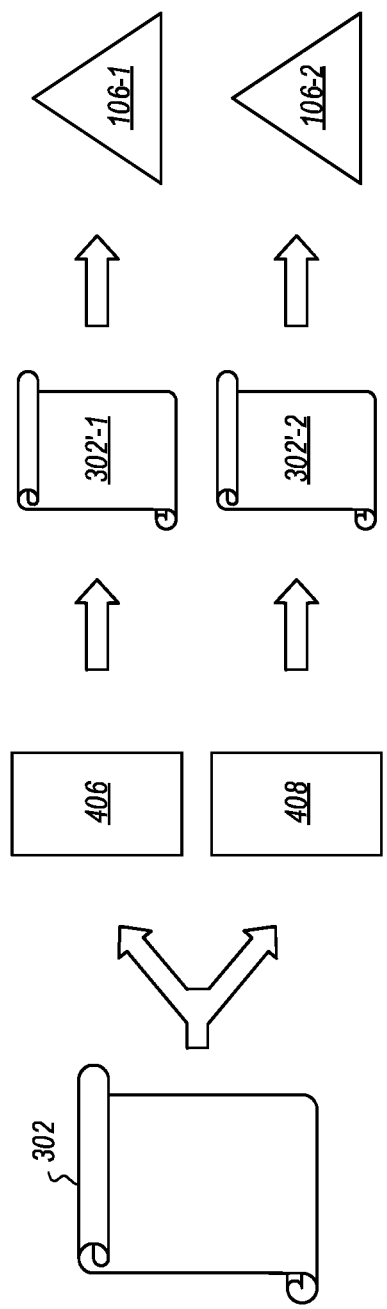
FIG. 4C illustrates using several manifest filters together and sending different filtered manifests to different clients.

In yet another alternative or additional embodiment as illustrated in FIG. 4C, filters may be applied in parallel with different filtered manifest being send to different clients. Thus, for example, the manifest 302 has a filter 406 applied to produce a filtered manifest 302'-1. Filtered manifest 302'-1 is sent to client 106-1. In parallel, the manifest 302 has a filter 408 applied to produce a filtered manifest 302'-2. Filtered manifest 302'-2 is sent to a client 106-2.

Some embodiments of the invention may be implemented where the origin server is provided by a cloud service provider such that various different cloud service customers can purchase hosting services from the cloud service provider. A cloud service provider provides services by allowing customers to "rent" compute, storage, and network resources. As a customer's need increases or decreases, the cloud service provider can adjust amounts of these resources from a shared pool of resources. This allows customers of the cloud to only rent the resources needed based on demand and save money when less resources are needed. Thus, for example, some embodiments of the invention may be practiced using Microsoft Azure Media Services, available from Microsoft Corporation of Redmond, Wash.

Given the general description above, attention is now directed to more specific examples and implementations of various embodiments of the invention.

In the context of both live streams and video on demand media assets, there are instances where a customer may want her end-users presented with a sub-set of the entire asset. This may be motivated by client-side-restrictions, asset quality, run-length or a desire to focus on a particular segment of the timeline.

In some embodiments, filters may be specified by a client device 106 such that the filters are applied to the manifest 302 at the origin server 102 and/or the CDN edge node 104. Alternatively or additionally, the origin server 102 could also detect the client device 106 making the requests, and select filters accordingly. For example, some embodiments may map a user agent for a device to specific named filters.

Various embodiments may exhibit certain features and/or functionality. For example, some embodiments may be implemented in a way that preserves the ability to name, save and re-use manifest filters as Representational State Transfer (REST) entities within a media platform. Alternatively or additionally, embodiments may be implemented to include the ability to use manifest filters in real time for manifest requests. Alternatively or additionally, embodiments may be implemented to include the ability to create streaming settings, (such as the Live back-off position) on the server side (typically a client-side setting). Alternatively or additionally, embodiments may be implemented to include the ability to create a single manifest which applies to more than one protocol simultaneously. Alternatively or additionally, embodiments may be implemented to include the ability to set a default manifest filter which will apply to all manifest requests, without being explicitly specified.

In media streaming, there are both manifests and media-chunks. Embodiments herein may be implemented to allow for filtering such that media chunks retain their idempotence and cachability across the CON and origin servers. Thus, in some embodiments, no new URLs need to be produced for the media chunks.

Consider that the asset 202 is comprised of streams with various attributes and a timeline 208. It may be in the customer's (e.g. a customer of a cloud based streaming media service where the customer provides streaming media to end user devices) interest to limit the streams which are presented to the user client device 106, for example, to restrict by bitrate, resolution or codec. Or there may be scenarios where the asset is prohibitively long, and the customer wants to present a single sub-clip of the timeline to the user client device 106.

There are many attributes in a manifest 302 and these could be filtered in several different ways. For example, attributes could be filtered by exact match or enumeration. Alternatively or additionally, attributes could be filtered by using greater than and less than operators. Alternatively or additionally, attributes could be filtered by exclusion. These methods can be used in alone or in combination as appropriate.

Some embodiments may implement filters to manage device capabilities. In particular, the device world is highly fractioned and support for protocols, codecs, bitrates and resolutions will vary greatly. However, it is impractical and costly to encode several times specifically with one encoding for each type of device. Content owners and distributors are looking for simple ways to deliver content to many devices. One solution, as described above, is using multiple bitrate assets, which address the multi-protocol aspect of the problem by allowing source files in the form of multi-bitrate MP4, Smooth, or other files to be muxed at the origin server 102 to, for example, Smooth, HLS, HDS and DASH/CSF for delivery. However, asset packaging only addresses protocols, and ultimately presents the full multi-bitrate asset to the client devices 106. Thus, for example, previously a mixed encoding profile containing both H.264 Baseline and H.264 High may have been presented to a device which only supports Baseline; such as for example, older Android devices.

Similarly, premium content owners are looking to deliver premium audio. They are interested in using differing bitrates of AAC, different profiles, HE-AAC and AAC-LE, as well as 5.1 surround sound via Dolby Digital Plus and DTS. If they deliver an iOS Application, they must also provide at least one variant stream which is less than 64 kbps in aggregate (usually audio-only). Multi-bitrate audio is not well supported in today client frameworks. There are no known MBR audio algorithms to date and track selection is the only mechanism on those client devices which support it. Some frameworks simply cease to function if an unsupported track is selected. By allowing server-side restriction based on codecs using filtering of assets manifests, embodiments can address some of the capability restrictions of the current device landscape.

Some embodiments may be directed to optimizing for bandwidth and power consumption on mobile devices. It is generally agreed that sending a higher resolution than a device is capable of displaying is wasteful in bandwidth and device computation, as the device must decode an excess of information, only to scale it down for display. Some embodiments herein may provide server-side restrictions based on resolution using filtering of assets manifests. In this way, embodiments can address bandwidth and power consumption on mobile devices.

Some embodiments may be directed to forcing quality restrictions. Notably, embodiments may be implemented that force either or both of upper limits and/or lower limits on quality. A content owner may be intent on delivering a particular experience to their end-users depending on the target device 106. When delivering to a set-top box or gaming console, for example, the content owner may want to force the device to consume only higher bitrates. This may have the consequence of buffering in slower network conditions, however, some content owners may be under studio contract, or other constraint to only deliver a particular quality for certain titles under certain conditions.

Some content owners differentiate their offerings by having pricing tiers for HD (high definition) and SD (standard definition) content. Thus, a content owner may have a need to restrict a user to lower qualities. This may be done via a digital rights management system by restricting access to HD content versus SD content through keys and rights. However, restricting tracks is complex across player frameworks, and many would not be able to differentiate between tracks for which they have the keys and those for which they will get decryption errors. It is advantageous to be able to limit the tracks to a subset which matches a particular key/right for the SD quality tier. This can be accomplished by applying appropriate filters at the origin server 102 to a manifest 302 for an asset 202. Thus, by allowing server-side restriction based on bitrate, embodiments can enable content owners and distributors to manage quality concerns.

Some embodiments may facilitate multiple language support. Multiple language support is supported with differing implementations across device-specific player-frameworks. By allowing server-side restriction using filters based on language, embodiments can manage multi-lingual assets.

Some embodiments include functionality for operating on live content streams. In particular, embodiments of the invention can create a plurality of virtual program periods out of a long running stream. This can be accomplished either while it is still a live program, or later as a VOD asset. Many live events are long running and a broadcaster may want to section these into logical program start and stop sequences, without limiting the ability for someone watching the live stream from seeking back into a DVR window. These smaller sequences may be more manageable on mobile devices and provide additional virtual content for a content provider. Examples of such virtual programs are the quarters of a football or basketball game, the innings in baseball, or individual events of an afternoon of Olympics programming.

Figure 5:
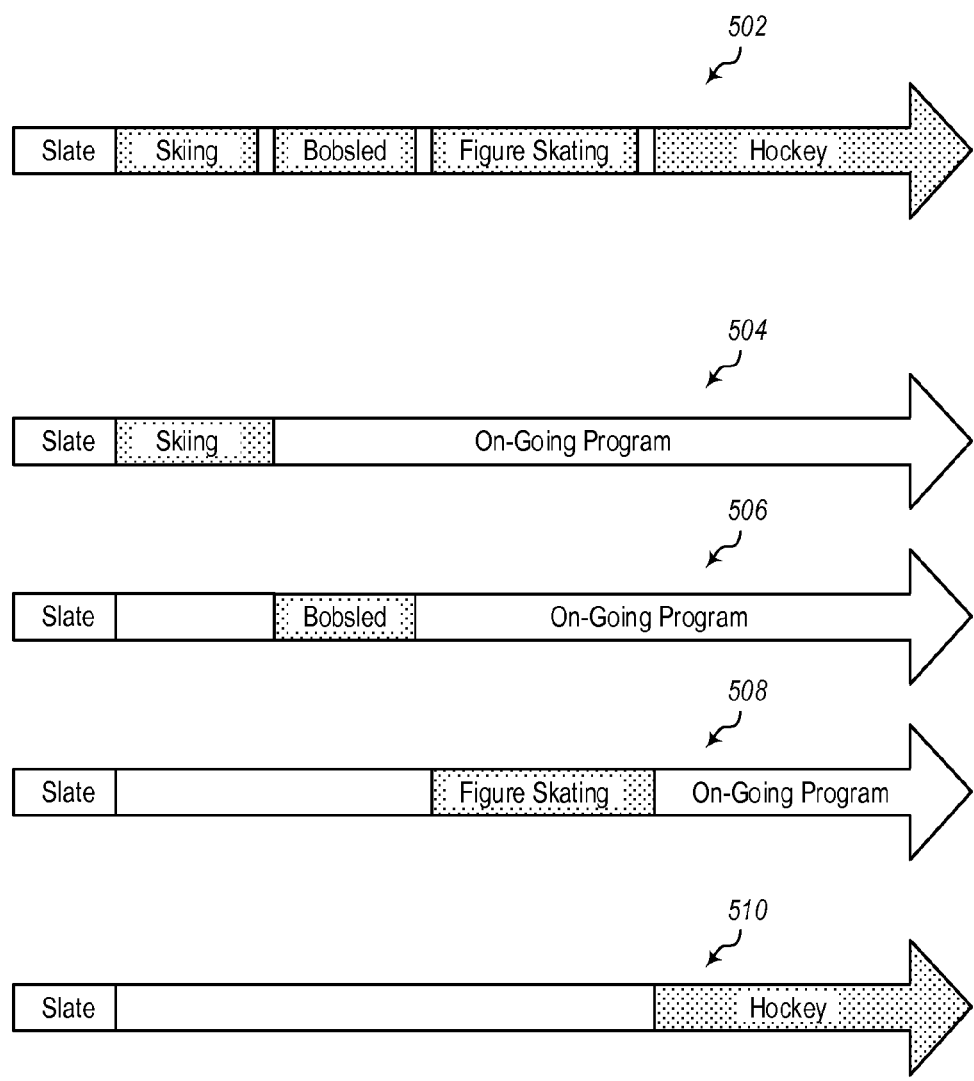
FIG. 5 illustrates using filtering to create distinct programs from a long running stream by filtering time stamps.

For example, reference is now made to FIG. 5. FIG. 5 illustrates a continuous stream 502 of a number of different sporting events being broadcast as a live stream. A manifest 202 may contain time markers in the timing information 208. The time markers can be filtered to provide a view of the asset to a client device 106 showing only an individual program. Thus, the user at the device 106 may see a manifest that provides a view of only a skiing program 504, only a bobsled program 506, only a Figure skating program 508 or only a hockey program 510.

Figure 6:
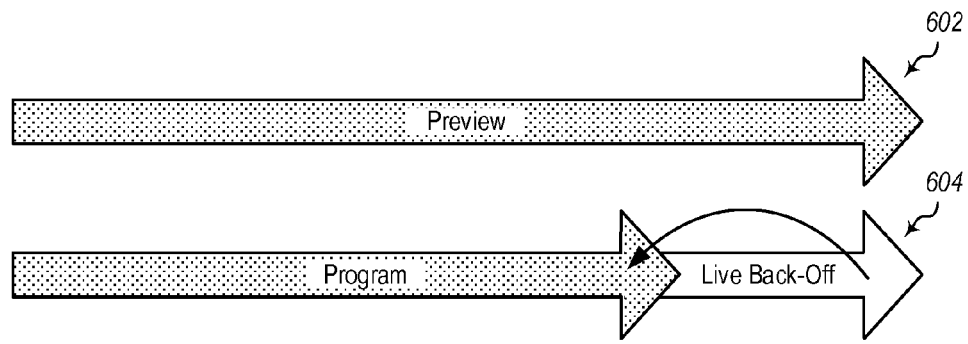
FIG. 6 illustrates creating a live back-off by filtering time stamps.

With reference to FIG. 6, manifest filtering of time markers in the timing information 208 can be used to remove several seconds from the live edge of a live program to create a program back-off. This allows the broadcaster to watch the presentation on the preview publication point 602 and create advertisement insertion points ahead of when the viewers are receiving the stream (usually backed-off 30 seconds) as illustrated at 604. The broadcaster can then push these advertisements to their client frameworks (typically using XML or JSON objects) in time for them to be received and processed before the advertisement opportunity.

Figure 7:
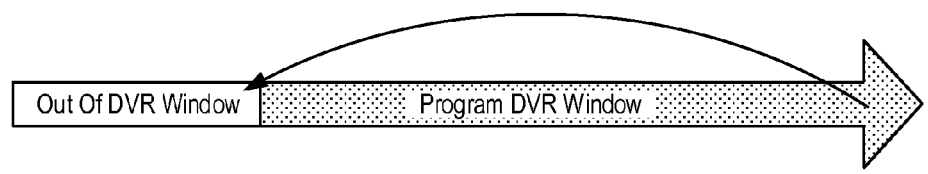
FIG. 7 illustrates creating a DVR window by filtering time stamps.

As illustrated in FIG. 7, manifest filtering of time markers in the timing information 208 can be used to create a rolling DVR window, without necessarily deleting media. There are many scenarios where the broadcaster wants to provide a limited DVR window which moves with the live edge. The broadcaster may still be using the data that is out of the DVR window for highlight clips, or to create VOD programs or clips.

In some cases, the user may want to apply more than one filter to an asset. For example, they may want to define a number of device filters, (XBOX, iPad, iPhone, Windows Phone, Flash, Silverlight), and for each of these, apply a timeline restriction. Thus, a device filter and a timeline filter may be applied. FIGS. 4A-4C illustrates an example of applying multiple filters.

Notably, some filters are more persistent than others. For example, the device filters are re-useable and may only change a few times a year, whereas the time-line filters are typically asset-specific. Therefore there is value in persisting certain filters, and value in specifying other filters at manifest-request time.

In some embodiments, multiple timeline filters may be applied for live scenarios. As illustrated in FIGS. 4A-4C, a user may need to be able to set more than one filter algorithm. For example, for most live broadcaster scenarios, a timeline filter for implementing a rolling DVR window and timeline filter for trimming the slate from the top of the asset may need to be implemented. In an alternative example, for certain large sports broadcasting customers, a timeline filter implementing a live backoff and a timeline filter implementing rolling DVR window and a timeline filter for trimming the slate from the top of the asset may be implemented.

Figure 8:
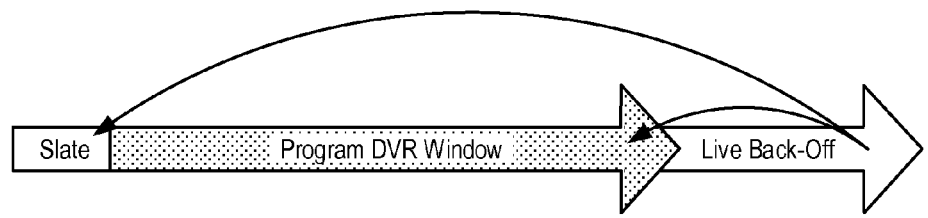
FIG. 8 illustrates the results of stacking filters.
Figure 9:
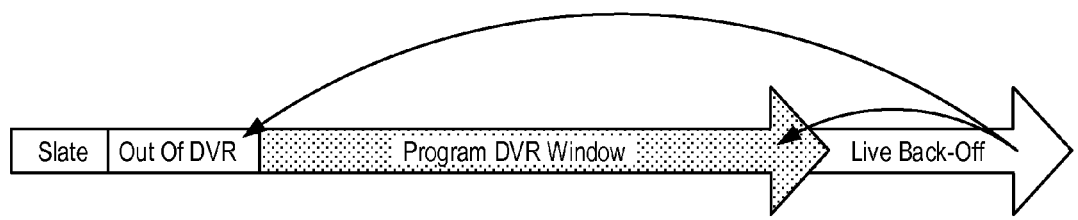
FIG. 9 illustrates additional results from stacking filters.

For example, FIG. 8 illustrates that the slate removal restricts the chunks in part of the DVR window demonstrating the AND nature of these filters. If any one filter removes a chunk, then it is not available for inclusion by the next filter. This is commutative, filter order does not matter. This is illustrated by FIG. 9, which illustrates a representation of later in the stream.

However, as a live asset gets bigger, and virtual programs end, the broadcasters may also want to create new filters, aside from the ones used on the live streams, to delimit these virtual program periods. Thus, it may be relevant for a single asset to have many named filters. Embodiments can provide flexibility in both applying filtering mechanisms, and allowing a multiplicity of these filters.

In some cases, a content owner may want to present several sub-clips as a single asset. Since manifest filtering does not affect the media fragments, the timeline for such an asset would have discontinuities, and not all streaming protocols handle discontinuities sa gracefully. In the case of multiple sub-clips, embodiments can use a composition of two or more timeline filters: E.g. (0:05:00<t<0:10:00)||(0:20:00<t<0:25:00)

From a single asset may arise many streaming scenarios. Embodiments therefore provide multiple addressable manifests for a single asset using user-defined tokens.

Various features may be implemented in various embodiments. For example, filtered manifest may be able to be remuxed to any supported output format. Embodiments may be implemented where fragments will remain idempotent, both the content and URL will not change, regardless of filter changes.

If a manifest filter changes, this publishes a new manifest at the same URL, which breaks downstream caching at the CDN edge nodes. If this is a live manifest, then it has a short TTL, and will not be greatly affected. However for VOD manifests with long TTL, care may need to be taken not to modify filters which are already published. Thus, some embodiments make a copy of filter, modify the copy and save it with a different name.

Ideally a user would be presented with the original manifest, and then include or exclude various attributes that will make up the filters used to create a 'rendition' of the asset. As used herein, the term "rendition" represents a particular, filtered, version of the asset. A rendition contains a collection of filters for various manifest properties.

To better illustrate various example workflows, the following illustrates various pseudo objects and their interactions. A new entity IAssetRendition is created. In the illustrated example, it has an array of the complex type ManifestFilter. It will be a collection on IAsset. It will track which Assets for which it has been associated. Thus:

New IAssetRendition Entity:

```
IAssetRendition.Name
IAssetRendition.Id
IAssetRenditon.ManifestFilters [ ]
IAssetRendition.AssociatedAssets [ ]   (read-only,   setter is in the IAsset)
```

New IManifestFilters Complex Type:

```
IManifestFilters.Type = enum {
     VideoBitrate,
     AudioBitrate,
     VideoMaxWidth,
     VideoMaxHeight,
     CODEC,
     Language,
     AbsoluteStreamTime,
     TimeRelativeToStreamEndInSec}
IManifestFilters.Operator = enum {GE, LE, EQ, NEQ}
IManifestFilters.Value = "stringValue"
```

Typical CRUD on IAssetRendition:

```
IAssetRendition AssetRendition =
Context.AssetRenditions.Create ("AssetRenditionName")
Context.AssetRenditions.Delete (Id)
```

Helper Function:

```
IAssetRendition  newAssetRendition =
Asset.AssetRenditions.CreateFrom (sourceAssetRenditionId,   "Some New
Rendition Name") ;
```

The Collection on Asset has CRUD, as Per Usual Design Patterns:
With corresponding Async functions.

```
           Asset.AssetRenditions.Add
           Asset.AssetRenditions.Remove
           Asset.AssetRenditions.Update
```

The following illustrates various usage examples.

In the following example, an example of composing a re-useable filter is illustrated. In this particular example, it is desired to only use higher bitrate streams. The reusable filter is as follows:

```
Var xboxRendition = context.IAssetRenditions.Create ("Xbox_v1.")
xboxRendition.ManifestFilters.Add(new   IManifestFilter ( )  {
     Type = VideoBitrate,
     Operator = GE,
     Value = "20000"
}) ;
```

The following illustrates the application of the filter to some asset:

targetAsset.AssetRenditions.Add(xboxRendtion);

The following illustrates the usage of the filter:

theAsset.ism/Manifest(filternames=Xbox_v1)

Another example of composing a re-useable filter is illustrated. In this particular example, it is desired to only provide media to Android mobile devices to use a resolution lower than 1020×768. The reusable filter is as follows:

```
Var androidLowRes =
context. IAssetRenditions.Create ("AndroidLowRes_v1")
androidLowRes.ManifestFilters.Add (new   IManifestFilter ( )  {
     Type = VideoMaxWidth,
     Operator = LE,
     Value = "1019"
} ) ;
androidLowRes.ManifestFilters.Add (new   IManifestFilter ( )  {
     Type = VideoMaxHeight,
     Operator = LE,
     Value = "767"
} ) ;
```

The following illustrates the application of the filter to some asset:

targetAsset.AssetRenditions.Add(androidLowRes);

The following illustrates the usage of the filter:

theAsset.ism/Manifest(filternames=AndroidLowRes_v1)

The following illustrates an example of composing a re-useable filter that will define a live backoff and DVR window. It is desired to set the backoff at 10 seconds and the DVR length at 2 hours. The implementation is as follows:

```
Var typicalLive = context.IAssetRenditions.Create ("TypicalLive")
typicalLive.ManifestFilters.Add (new   IManifestFilter ( )  {
     Type = TimeRelativeToStreamEndInSec,
     Operator = LE,
     Value = "10"
} ) ;
typicalLive.ManifestFilters.Add (new (IManifestFilters ( )  {
     Type = TimeRealtiveToStreamEndInSec,
     Operator = GE,
     Value = TimeSpan.FromHours (2) .TotalSeconds
} ) ;
```

The following illustrates the application of the filter to some asset:

targetLiveAsset.AssetRenditions.Add(typicalLive);

The following illustrates the usage of the filter:

theAsset.ism/Manifest(filternames=TypicalLive)

The following illustrates an example of composing a re-useable filter that will create a sub-clip of an asset. It is desired to add a virtual program to a live asset from the 1hr to 2 hr mark, effectively sub-clipping it. In the illustrated example, also available to that asset are device renditions and the typical live settings. The following illustrates the implementation:

First, known renditions are associated:

```
targetLiveAsset.AssetRenditions.Add (xboxRendition) ;
targetLiveAsset.AssetRenditions.Add (androidLowRes) ;
targetLiveAsset.AssetRenditions.Add (typicalLive) ;
```

Next, a new absolute stream time filter is created:

```
Var clip1 = context.IAssetRenditions.Create ("clip1")
clip1.ManifestFilters.Add(new IManifestFilter ( ) {
    Type = AbsoluteStreamTime,
    Operator = GE,
    Value = "142334340036000000000"
} ) ;
clip1.ManifestFilters.Add(new IManifestFilter ( ) {
    Type = AbsoluteStreamTime,
    operator = LE,
    Value = "142334340072000000000"
} ) ;
```

The following illustrates the usage of the filter:

```
theAsset.ism/Manifest (filternames=clip1, AndroidLowRes_v1)
theAsset.ism/Manifest (filternames=clip1, Xbox_v1)
```

The following illustrates server interactions with filters. In one example embodiment, the server will parse a comma (or ampersand) separated list of filternames in the manifest query properties:

theAsset.ism/Manifest(filternames=clip1.Xbox_v1))

The server will receive or retrieve the filtering information for these named filters. The server will apply them to the original manifest using AND logic (such that each additional filter can only remove information from the filtered manifest of the previous operation). If a user wishes to create a multi-clip, they will need to put all the AbsoluteStreamTimeInHNS filters in a single rendition, as putting them in two different renditions will cause them to mutually exclude the whole timeline. Alternatively a mechanism to signal both AND logic and OR logic may be implemented.

Embodiments may include functionality for providing a user interface that allows a user to define manifest filtering. The user interface may be provided in a number of different locations and scenarios. For example, the user interface may be provided in conjunction with an asset delivery system to allow administrators at the asset delivery system to define various filters. Alternatively, the user interface may be provided at a client device to allow a client to create filters and to request that asset manifests be filtered according to a filter defined at the client device.

Figure 10:
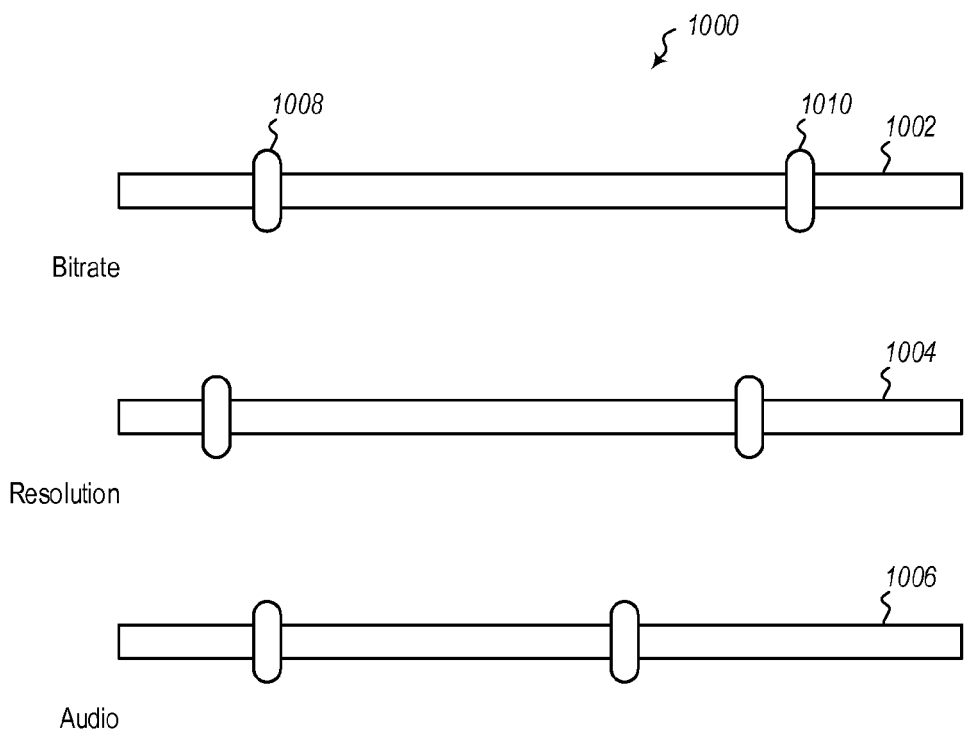
FIG. 10 illustrates user interface controls for defining filters.

Referring now to FIG. 10, an example of a user interface 1000 for defining a filter is illustrated. The user interface 1000 may be displayed on a computer or device display to a user, which may also include an administrator or other user. The user interface 1000, in this example, includes three range control sliders 1002, 1004 and 1006. The sliders in this example control upper and lower limits of filters. For example, the slider 1002 controls an upper and a lower limit of resolution. The slider 1004 controls an upper and a lower limit of bitrate. The slider 1006 controls an upper and lower limit of audio track quality.

A user can set slider controls (e.g. slider controls 1008 and 1010) at upper and lower limits. This will define filter ranges for a filter being defined. When such a filter is applied to a manifest for an asset, any portion of the asset that is above the upper limit or below the lower limit will have its description filtered out of the manifest.

Thus, an example user interface may involve a presentation of the properties with checkboxes, sliders, timelines, etc. and the ability to set operators and boundary values. In one example embodiment, the authoring UI would then make calls to REST API to create or modify entities.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
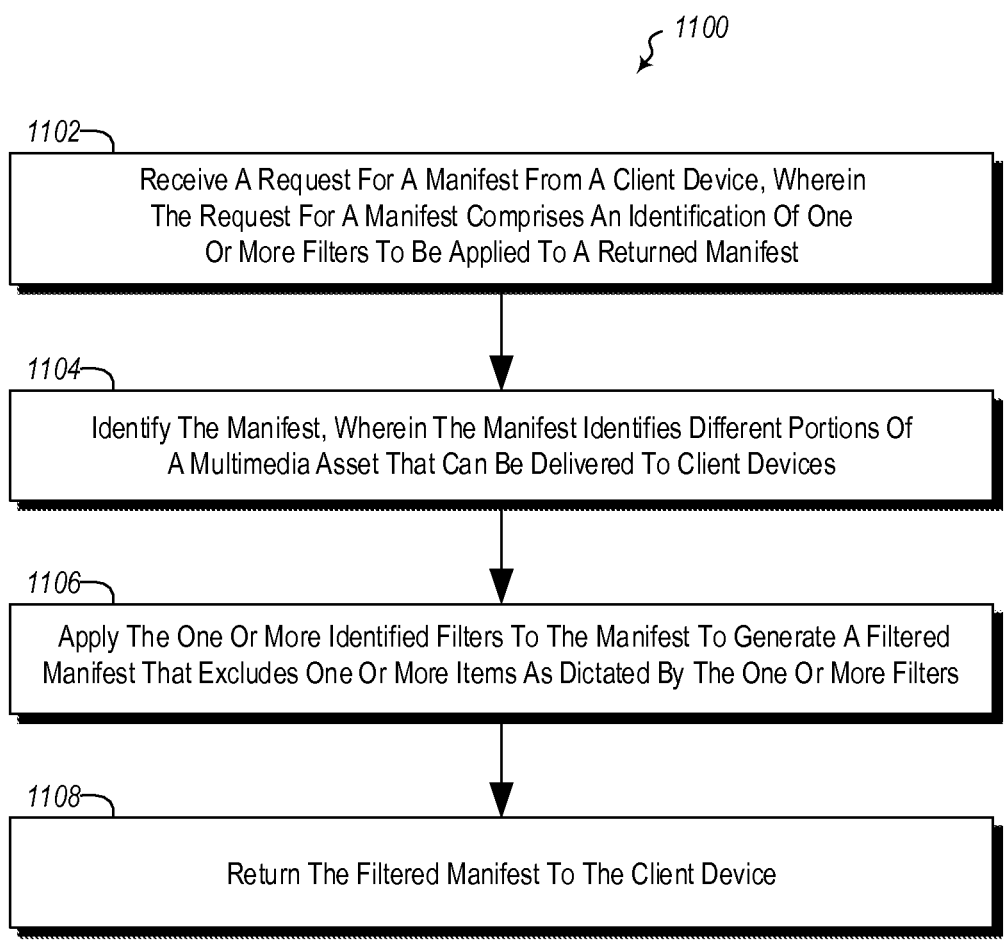
FIG. 11 illustrates a method of providing a VOD or streaming video manifest.
Figure 12:
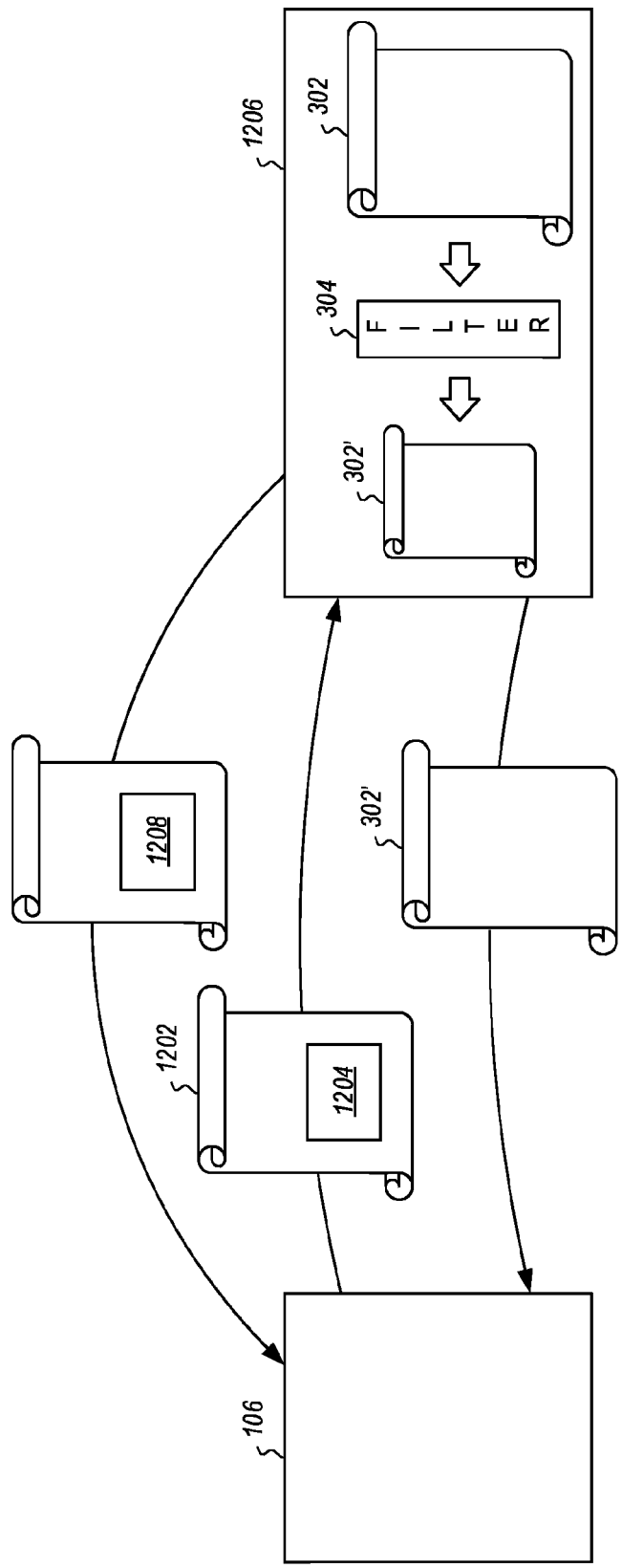
FIG. 12 illustrates interaction of a server and a client device.

Referring now to FIG. 11, a method 1100 is illustrated. The method 1100 may be practiced in a computing environment and includes acts for providing a VOD or streaming video manifest. The method 1100 includes, at a server, receiving a request for a manifest from a client device. The request for a manifest comprises an identification of one or more filters to be applied to a returned manifest (act 1102). For example, various filters may be identified, such as filters for filters configured to filter based on video resolution, filters configured to filter based on bitrate, filters configured to filter based on audio quality, filters is configured to filter based on time stamps, etc. FIG. 12 illustrates an example of a client device sending a request 1202 including an identification 1204 of one or more filters to a server 1206.

The method 1100 further includes, identifying the manifest (act 1104). The manifest identifies different portions of a multimedia asset that can be delivered to client devices. For example, the manifest, as illustrated above, may identify different resolutions of multimedia content in an asset (e.g. 720p, 1080p, etc.), different bitrates of multimedia content in an asset (e.g. 1 Mbs, 0.7 Mbs, etc.) different audio qualities (e.g. 7.1, 5.1, stereo, mono, etc.), various time stamps for multimedia content in an asset, etc. For example, FIG. 12 illustrates the server 1206 identifying a manifest 302. Notably, the server 1206 may be a content delivery node, an origin node or other appropriate node.

The method 1100 further includes applying the one or more identified filters to the manifest to generate a filtered manifest that excludes one or more items as dictated by the one or more filters (act 1106). For example, as illustrated in FIG. 12, the server 1206 may apply the filter 304 to the manifest 302 to create the filtered manifest 302'.

The method 1100 further includes returning the filtered manifest to the client device (act 1108). For example, as illustrated in FIG. 12, the filtered manifest 302' is returned to the client device 106'.

The method 1100 may be practiced where the one or more filters are created at the client device. For example, a client may be able to decide what content it can consume, or what content it prefers to consume, and can create a custom filter that can be sent to a content server. The content server can then apply the filter at the content server, and provide a manifest which only enumerates multimedia content options that the client device can render or that the client device prefers to receive.

The method 1100 may be practiced where the one or more filters are selected from a predefined set of filters provided to client. For example, the set of filters could be provided to the client by the content server to indicate a list of filters that the content server is able to apply to assets at the content server, or a list of filters that are particularly applicable to content at the content server. Alternatively or additionally, a multimedia player app or application at the client device may have a set of filters defined in the app that can be specified to the content server. New or different filters may be specified in app updates or as a filter set that can be plugged into an app.

The method 1100 may further include sending an indication of a selection of filters that can be applied at the server to the client device. In some such embodiments, the identification of one or more filters to be applied to a returned manifest is created by the client using the indication of a selection of filters that can be applied. Thus, the content server may send an indication of a selection of filters that can be selected at a client device and indicated to a content server, where the filters can be applied.

The method 1100 may be performed where at least one of the one or more filters includes both an upper and lower limit. Thus, for example, embodiments may set an upper resolution limit to be filtered out and a lower resolution limit to be filtered out. Similar examples may be implemented for bitrate, audio quality, time stamps, or other items in the manifest. Alternatively, in some embodiments, the upper and lower limit may be set and items falling between the upper and lower limit may be filtered and items above the upper and lower limit may be included in the manifest.

Figure 13:
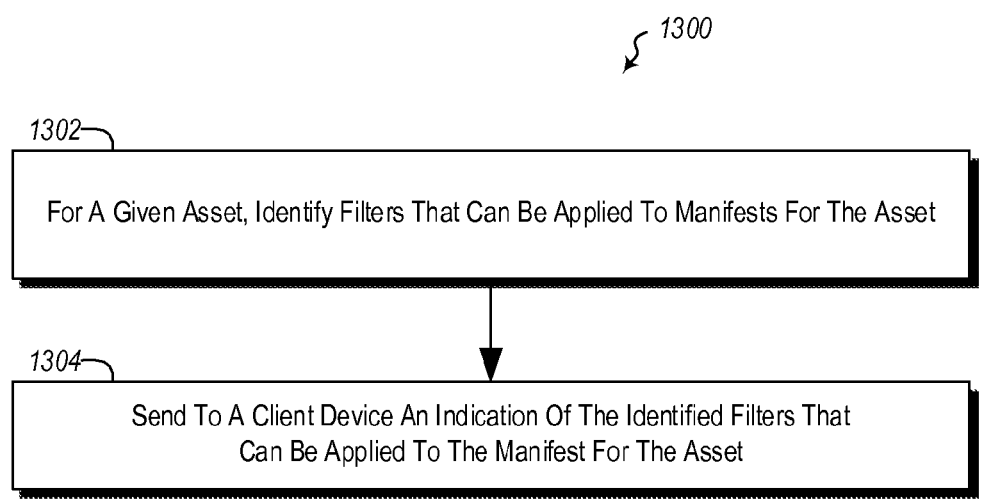
FIG. 13 illustrates a method of managing VOD or streaming video assets.

Referring now to FIG. 13, a method 1300 is illustrated. The method 1300 may be practiced in a computing environment. The method 1300 includes acts for managing VOD or streaming video assets. The method includes, for a given asset, identifying filters that can be applied to manifests for the asset (act 1302). The method 1300 further includes sending to a client device an indication of the identified filters that can be applied to the manifest for the asset (act 1304). For example, as illustrated in FIG. 12, the server 1206 may send a list 1208 of filters to a client device 106 that can be applied to a particular multimedia asset.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program Scode means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of providing a VOD or streaming video manifest, the method comprising:
at a server, receiving a request for an existing manifest from a client device, wherein the request for a manifest comprises an identification of one or more filters previously identified to the client device, wherein each of the filters comprises an enumeration of computer readable limitations to be applied to the existing manifest to create a filtered version of the existing manifest, wherein the identification of one or more filters specifies at least one named, previously saved, re-usable filter including a filter based on video resolution, a filter based on bitrate, a filter based on audio quality, or a filter based on time stamps;
at the server, identifying the existing manifest, wherein the existing manifest identifies different existing portions of a multimedia asset that can be delivered to client devices;
at the server, applying the one or more identified filters to the existing manifest to generate the filtered version of the existing manifest from the existing manifest that filters out from the existing manifest one or more items as dictated by the one or more filters such that the filtered version of the existing manifest includes an enumeration of less than all items enumerated in the existing manifest; and
at the server, returning the filtered version of the existing manifest to the client device.

2. The method of claim 1, wherein the one or more filters are created at the client device and provided to the server.

3. The method of claim 1, wherein the one or more filters are selected from a predefined set of filters provided to client.

4. The method of claim 1, further comprising sending an indication of a selection of filters that can be applied at the server to the client device, and wherein the identification of one or more filters to be applied to the existing manifest is created by the client using the indication of a selection of filters that can be applied.

5. The method of claim 1, wherein the identification of one or more filters to be applied to the existing manifest specifies both an upper and lower limit of a bit rate.

6. The method of claim 1, wherein at least one of the one or more filters is configured to filter based on video resolution.

7. The method of claim 1, wherein at least one of the one or more filters is configured to filter based on at least one of audio or video bitrate.

8. The method of claim 1, wherein at least one of the one or more filters is configured to filter based on at least one of audio channels, codec or language.

9. The method of claim 1, wherein at least one of the one or more filters is configured to filter based on time stamps.

10. In a computing environment, a method of managing VOD or streaming video assets, the method comprising:
for a given asset, identifying filters, wherein each of the filters comprises an enumeration of computer readable limitations that can be applied to an existing manifest for the asset, wherein identifying filters that can be applied to the existing manifest for the asset identifies at least one named, previously saved, reusable filter including a filter based on video resolution, a filter based on bitrate, a filter based on audio quality, or a filter based on time stamps; and
notifying a client device of the identified filters that can be applied to the existing manifest for the asset.

11. The method of claim 10, further comprising, receiving an indication from the client device that one or more filters from the identified filters should be applied to the existing manifest, and as a result, sending a filtered version of the existing manifest to the client device that is filtered by applying the one or more filters indicated from the client.

12. In a computing environment, a system for providing a VOD or streaming video manifest, the system comprising:
one or more processors; and
one or more computer readable media, wherein the one or more computer readable media comprise computer executable instructions that when executed by at least one of the one or more processors cause the system to perform the following:
at a server, receiving a request for an existing manifest from a client device, wherein the request for a manifest comprises an identification of one or more filters previously identified to the client device, wherein each of the filters comprises an enumeration of computer readable limitations to be applied to the existing manifest to create a filtered version of the existing manifest, wherein the identification of one or more filters specifies at least one named, previously saved, re-usable filter including a filter based on video resolution, a filter based on bitrate, a filter based on audio quality, or a filter based on time stamps;
at the server, identifying the existing manifest, wherein the existing manifest identifies different existing portions of a multimedia asset that can be delivered to client devices;
at the server, applying the one or more identified filters to the existing manifest to generate the filtered version of the existing manifest from the existing manifest that filters out from the existing manifest one or more items as dictated by the one or more filters such that the filtered version of the existing manifest includes an enumeration of less than all items enumerated in the existing manifest; and
at the server, returning the filtered version of the existing manifest to the client device.

13. The system of claim 12, wherein the one or more filters are created at the client device and provided to the server.

14. The system of claim 12, wherein the one or more filters are selected from a predefined set of filters provided to client.

15. The system of claim 12, the one or more computer readable media, further comprising computer executable instructions that when executed by at least one of the one or more processors cause the system to send an indication of a selection of filters that can be applied at the server to the client device, and wherein the identification of one or more filters to be applied to a returned manifest is created by the client using the indication of a selection of filters that can be applied.

16. The system of claim 12, wherein the identification of one or more filters to be applied to a returned filtered version of the existing manifest specifies both an upper and lower limit of a bit rate.

17. The system of claim 12, wherein at least one of the one or more filters is configured to filter based on video resolution.

18. The system of claim 12, wherein at least one of the one or more filters is configured to filter based on at least one of audio or video bitrate.

19. The system of claim 12, wherein at least one of the one or more filters is configured to filter based on at least one of audio channels, codec or language.

20. The system of claim 12, wherein at least one of the one or more filters is configured to filter based on time stamps.

* * * * *